United States Patent
Nagatomo

(10) Patent No.: US 6,738,428 B1
(45) Date of Patent: May 18, 2004

(54) APPARATUS AND METHODS FOR DECODING A PREDICTIVELY ENCODED SIGNAL AND REMOVING GRANULAR NOISE

(75) Inventor: Teiji Nagatomo, Miyazaki-gun (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/520,214

(22) Filed: Mar. 7, 2000

(30) Foreign Application Priority Data

Mar. 18, 1999 (JP) .......................................... 11/072918

(51) Int. Cl.[7] .............................................. H04B 14/06
(52) U.S. Cl. ...................................................... 375/244
(58) Field of Search .................................. 375/242, 243, 375/244, 245, 247, 254, 241, 240.03, 240.12; 382/238, 251; 704/212, 500

(56) References Cited

U.S. PATENT DOCUMENTS

| | | | | |
|---|---|---|---|---|
| 4,449,190 A | * | 5/1984 | Flanagan et al. | ............ 375/240 |
| 4,831,636 A | * | 5/1989 | Taniguchi et al. | ........... 375/245 |
| 5,063,443 A | * | 11/1991 | Okajima et al. | ....... 375/240.14 |
| 5,424,739 A | * | 6/1995 | Norsworthy et al. | ........ 341/143 |

* cited by examiner

*Primary Examiner*—Don N. Vo
(74) *Attorney, Agent, or Firm*—Rabin & Berdo, LLP

(57) ABSTRACT

A predictive decoder removes granular noise from the decoded signal by one of the following methods: discarding a predetermined number of least significant bits of the decoded signal; taking the sum of each two successive values of the decoded signal and dividing the sum by two to obtain an output signal; or resetting the decoded signal to a fixed value during inactive periods. Inactive periods are detected according to criteria involving an adaptively adjusted step size and a quantized difference signal, both of which are obtained in the decoding process.

26 Claims, 3 Drawing Sheets

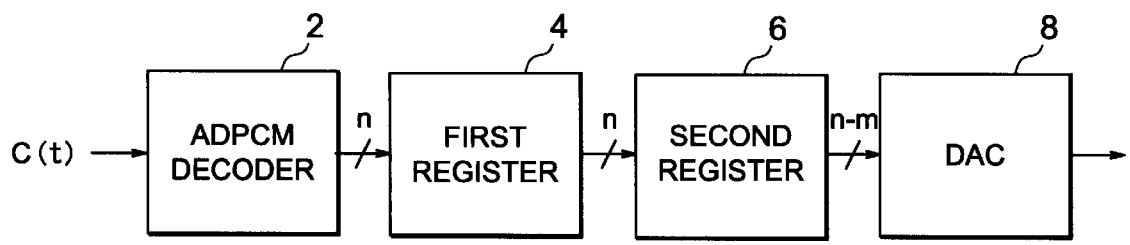
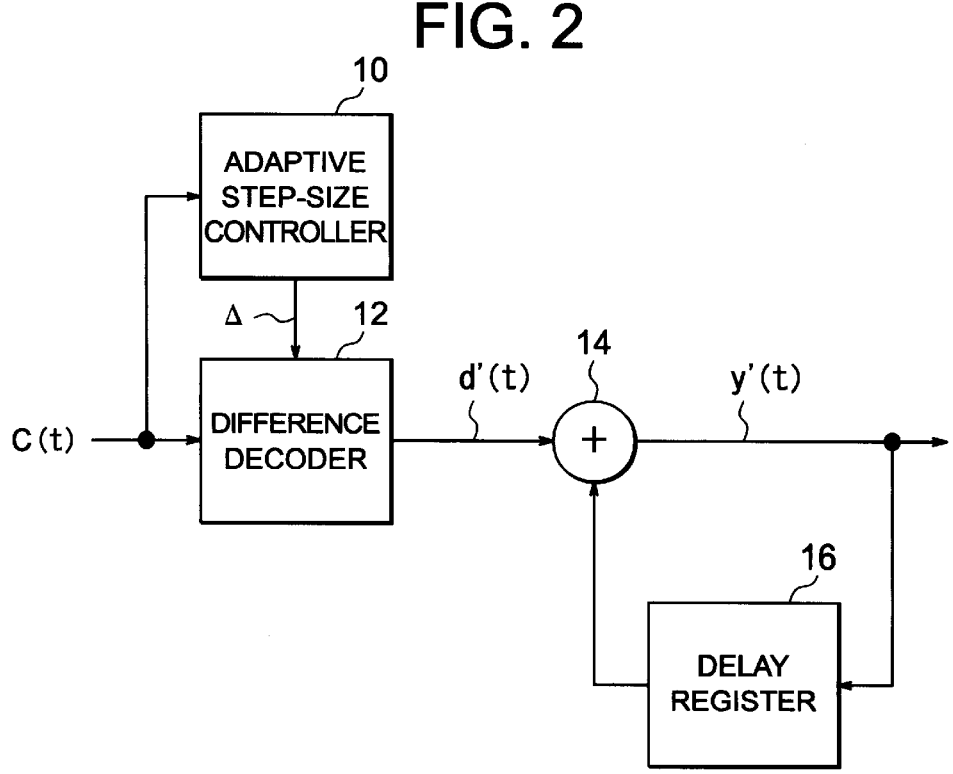

APPARATUS AND METHODS FOR DECODING A PREDICTIVELY ENCODED SIGNAL AND REMOVING GRANULAR NOISE

BACKGROUND OF THE INVENTION

The present invention relates to apparatus for decoding a signal encoded by a predictive coding method such as adaptive differential pulse code modulation (ADPCM) or adaptive predictive coding (APC), and to methods for removing noise from the decoded signal.

In predictive coding, an input source signal such as an audio signal is sampled, each successive sample value is predicted, and the difference between the sample value and the predicted value is coded according to a predetermined coding rule. In the decoder, the difference value is decoded, a similar prediction process is performed, and a decoded value is obtained by adding the decoded difference to the predicted value. In conventional ADPCM, the predicted value is the previous decoded value, and the coding rule is a quantization rule with an adaptive step size.

To reduce quantization error in ADPCM, the decoded difference values are located at or near the centers of the corresponding quantization steps. For efficient coding, the number of quantization steps is a power of two, including equal numbers of positive and negative steps, with no step centered on zero. Consequently, the decoded difference value is never zero. A resulting problem for audio signals is that when the signal source is completely silent, the decoded signal does not remain fixed at zero, but oscillates in the vicinity of zero, producing audible noise of the type referred to as granular noise.

Similar granular noise problems occur in APC and other predictive coding systems.

SUMMARY OF THE INVENTION

An object of the present invention is to eliminate granular noise.

According to a first aspect of the invention, a predictive decoder decodes a predictively coded signal to obtain a decoded signal, discards a predetermined number of least significant bits of the decoded signal, and produces an output signal from the remaining bits. The predetermined number of bits is the number of bits in which granular noise appears.

According to a second aspect of the invention, a predictive decoder decodes a predictively coded signal to obtain a decoded signal, and produces an output signal by adding each decoded signal value to the preceding decoded signal value and dividing the sum by two. This procedure completely eliminates granular noise of the type in which the decoded signal alternates between two values.

According to a third aspect of the invention, a predictive decoder decodes a predictively coded signal by a process that includes predicting a decoded signal value, adaptively adjusting a step size, obtaining a quantized difference value from the coded signal and the step size, and adding the quantized difference value to the predicted value to obtain an output signal. In addition, the decoder uses the step size and the quantized difference value to determine whether the coded signal represents an active source signal. When the coded signal is determined to represent an inactive source signal, the decoder resets the output signal to a fixed value. During intervals in which the output signal remains thus reset, granular noise is completely eliminated.

BRIEF DESCRIPTION OF THE DRAWINGS

In the attached drawings:

FIG. 1 is a block diagram of a predictive decoder illustrating a first embodiment of the invention;

FIG. 2 is a more detailed block diagram of the ADPCM decoder in FIG. 1;

DETAILED DESCRIPTION OF THE INVENTION

Figure 3:
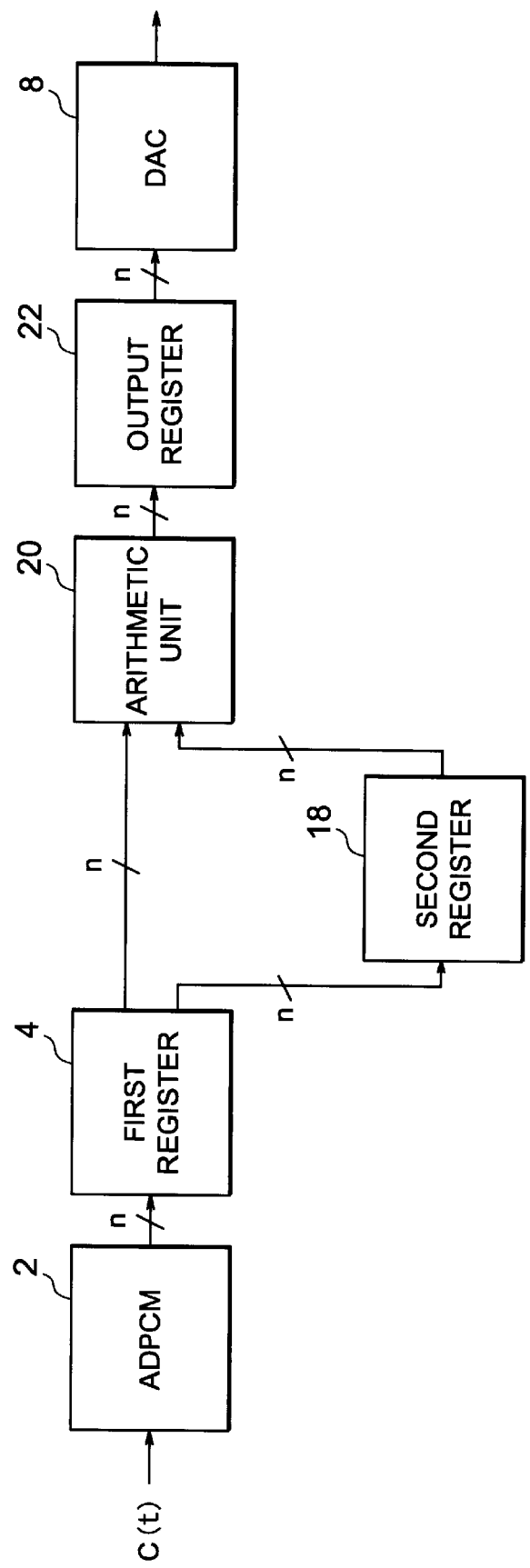
FIG. 3 is a block diagram of a predictive decoder illustrating a second embodiment of the invention.

Embodiments of the invention will be described with reference to the attached drawings, in which like parts are indicated by like reference characters. All of the embodiments are predictive decoders that receive a coded signal C(t) generated by ADPCM coding of an audio source signal. The letter t is an integer-valued discrete time variable, C(t) being the coded value of the t-th sample of the source signal.

Referring to FIG. 1, the first embodiment comprises an ADPCM decoder 2, a first register 4, a second register 6, and a digital-to-analog decoder (DAC) 8. The ADPCM decoder 2 decodes the coded signal C(t) to obtain an n-bit decoded signal, where n is a positive integer. The first register 4 stores each n-bit value of this decoded signal. The second register 6 receives the n-bit value stored in the first register 4 and stores the (n−m) most significant bits as output signal data, discarding the least significant m bits, where m is a positive integer less than n. The DAC 8 converts the (n−m)-bit output signal data to an analog output signal for amplification and reproduction through a loudspeaker (not visible).

FIG. 2 shows the internal structure of the ADPCM decoder 2. The ADPCM decoder 2 is a conventional device comprising an adaptive step-size controller 10, a difference decoder 12, an adder 14, and a delay register 16. The adaptive step-size controller 10 provides the difference decoder 12 with a step-size parameter Δ, adjusting Δ according to each received coded value C(t). For example, the adaptive step-size controller 10 may multiply the step size Δ by a factor read from a look-up table addressed by C(t). The difference decoder 12 then decodes C(t) according to Δ, obtaining a quantized difference signal d'(t). The adder 14 adds d'(t) to a predicted value to obtain the decoded signal value y'(t). The predicted value is y'(t−1), obtained by delaying the decoded signal for one sample period in the delay register 16, which thus functions as a simple prediction circuit.

The elements shown in FIGS. 1 and 2 are well-known electronic circuits, detailed descriptions of which will be omitted.

Next, the operation of the first embodiment will be described.

The operation of the ADPCM decoder 2 in FIG. 2 is summarized by the following equations, in which Δ(t) is the value of the step size Δ at time t, M(C(t)) is a non-zero value obtained from C(t) by the difference decoder 12, and the asterisk indicates a multiplication operation performed by the difference decoder 12.

$$y'(t) = y'(t-1) + d'(t)$$

$$d'(t) = \Delta(t) * M(C(t))$$

When the source signal is inactive, the coded signal C(t) tends to alternate between two values, one representing a minimum positive difference and the other representing a minimum negative difference. Under these conditions, the adaptive step-size controller 10 reduces the step size Δ(t) until a certain minimum step size is reached. From then on, if the source signal remains completely inactive, the quantized difference signal d'(t) alternates between predetermined minimum positive and negative values, which will be denoted +d'(min) and −d'(min), and the decoded signal y'(t) oscillates between two values separated by d'(min), such as zero and +d'(min). If this oscillation were to appear in the output of the decoder, it would be perceived as granular noise.

The n bits of the decoded signal y'(t) are stored in the first register 4. The (n−m) most significant bits are transferred from the first register 4 to the second register 6 at an arbitrary timing after y'(t) has been written in the first register 4, before the next value y'(t+1) is written. The number of discarded bits (m) is precisely the number of bits needed to express the value of +d'(min). If +d'(min) is equal to one (binary . . . 00001), for example, then just one bit is discarded.

When the decoded signal is transferred from the first register 4 to the second register 6, +d'(min) becomes zero. Accordingly, if y'(t) oscillates between zero and +d'(min), for example, the DAC 8 receives a constant zero value, and no granular noise is produced.

Depending on operating characteristics of the coder (not visible), granular noise may appear in more bits than the number needed to express +d'(min). However, if y'(t) oscillates among any group of values differing only in the least significant m bits, the oscillation disappears when the decoded signal value is transferred from the first register 4 to the second register 6. To eliminate granular noise during inactive periods, it therefore suffices to vary the first embodiment by choosing a value of m that includes all of the bits in which the granular noise might appear. This is a design choice that can be made on the basis of tests or simulation.

In a further variation of the first embodiment, the first register 4 and the delay register 16 are combined into a single register.

In another variation, the second register 6 is located in the DAC 8.

Next, a second embodiment will be described.

Referring to FIG. 3, the second embodiment comprises an ADPCM decoder 2, a first register 4, a second register 18, an arithmetic unit 20, an output register 22, and a DAC 8. The ADPCM decoder 2 decodes the coded signal C(t) to obtain an n-bit decoded signal, where n is a positive integer. The first register 4 stores each n-bit value of this decoded signal. When a new n-bit value is written in the first register 4, the old n-bit value is transferred from the first register 4 to the second register 18. The arithmetic unit 20 adds the two n-bit values stored in the first and second registers 4, 6 together, divides their sum by two, and writes the result into the output register 22. The DAC 8 converts the value stored in the output register 22 to an analog output signal for amplification and reproduction through a loudspeaker (not visible).

The ADPCM decoder 2 has the structure shown in FIG. 2, detailed in the first embodiment.

Next, the operation of the second embodiment will be described.

The ADPCM decoder 2 operates as explained in the first embodiment. If the decoded signal value output by the ADPCM decoder 2 and stored in the first register 4 is denoted y'(t), then the value stored in the second register 18 is y'(t−1), the value output by the ADPCM decoder 2 at the preceding sample timing. By adding these two values, the arithmetic unit 20 obtains an (n+1)-bit sum. By performing a one-bit right shift, for example, the arithmetic unit 20 divides the sum by two and reduces the number of bits to n. The output register 22 stores this n-bit result.

When the source signal is inactive, once the step size Δ in the ADPCM decoder 2 reaches its minimum value, the decoded signal y'(t) tends to alternate between two values y'(even), occurring when t is even, and y'(odd), occurring when t is odd. These two values are separated by d'(min), which is the minimum positive quantized difference value d'(t) that can be produced in the ADPCM decoder 2. If the output of the DAC 8 were to oscillate in a similar fashion, the oscillation would be perceived as granular noise, but for all values of t, the value stored in the output register 22 is {y'(even)+y'(odd)}/2. Since the input to the DAC 8 is held constant at this value, the granular noise is completely removed.

If ym'(t) represents the value stored in the output register 22 at time t, the above operation can also be described by the following equations.

$$y'(t) = y'(t-1) + d'(\min)$$

$$y'(t+1) = y'(t) - d'(\min)$$

$$y'(t+2) = y'(t+1) + d'(\min)$$

$$\begin{aligned}ym'(t+1) &= \{y'(t) + y'(t+1)\}/2 \\&= \{y'(t-1) + d'(\min) + y'(t) - d'(\min)\}/2 \\&= \{y'(t-1) + y'(t)\}/2 \\&= y'(t-1) + d'(\min)/2\end{aligned}$$

$$\begin{aligned}ym'(t+2) &= \{y'(t+1) + y'(t+2)\}/2 \\&= \{y'(t) - d'(\min) + y'(t+1) + d'(\min)\}/2 \\&= \{y'(t) + y'(t+1)\}/2 \\&= y'(t) - d'(\min)/2 \\&= y'(t-1) + d'(\min)/2\end{aligned}$$

The value stored in the output register 22 has an offset component of d'(min)/2, but the offset is constant, so no granular noise is produced.

A feature of the second embodiment is that granular noise is eliminated even if the decoded signal y'(t) oscillates between two values with opposite algebraic signs.

If the decoded signal y'(t) takes on more than two values during periods of source-signal inactivity, granular noise is still reduced, although not completely eliminated.

In a variation of the second embodiment, the first register 4 in FIG. 3 and the delay register 16 in FIG. 2 are combined into a single register. Similarly, the output register 22 may be combined with a register in the DAC 8.

Next, a third embodiment will be described.

Figure 4:
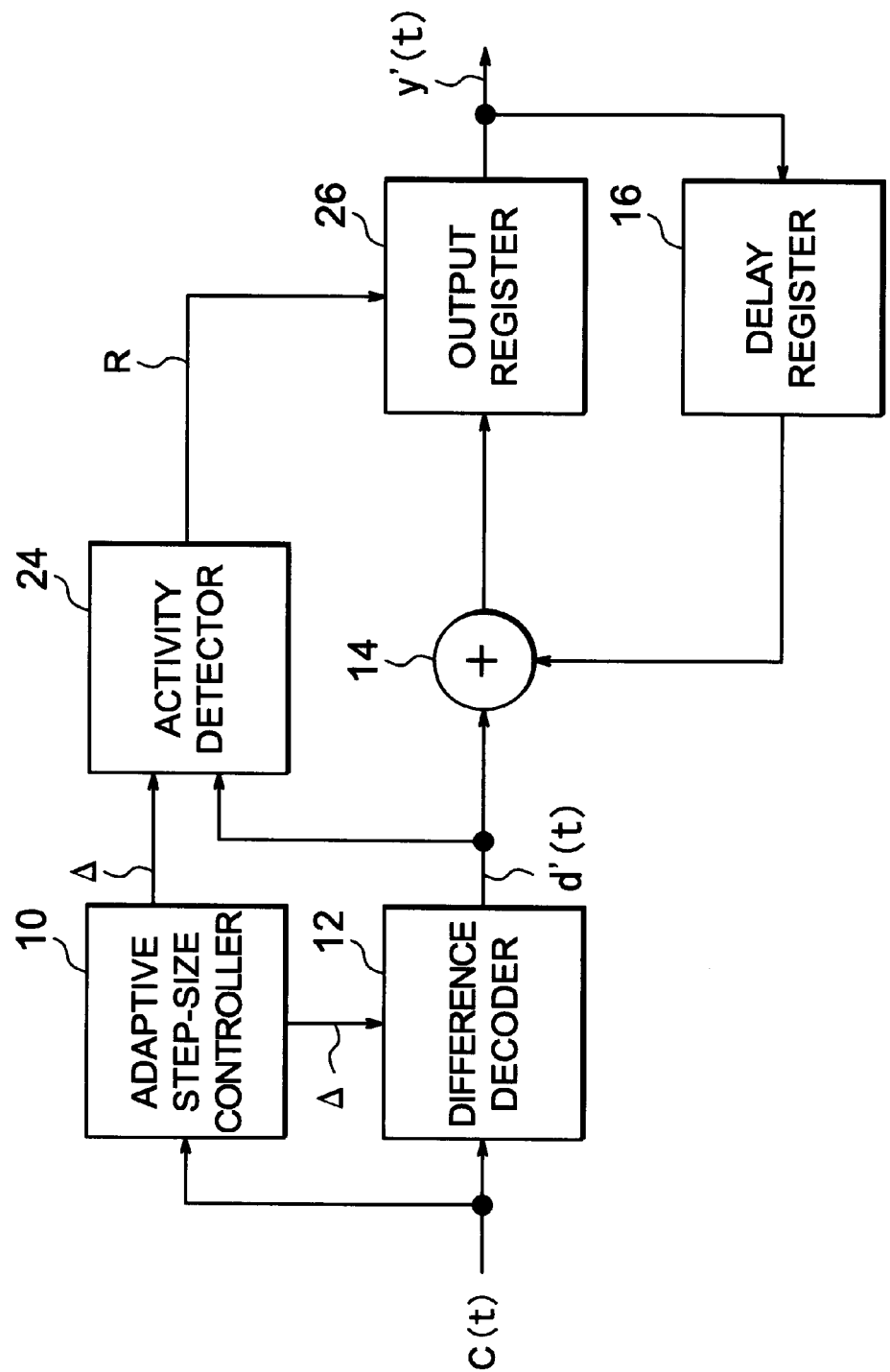
FIG. 4 is a block diagram of a predictive decoder illustrating a third embodiment of the invention.

Referring to FIG. 4, the third embodiment comprises an adaptive step-size controller 10, a difference decoder 12, an adder 14, a delay register 16, an activity detector 24, and an output register 26.

The adaptive step-size controller 10 provides the difference decoder 12 with a step-size parameter Δ, adjusting Δ according to each received coded value C(t). The difference decoder 12 decodes C(t) according to Δ, obtaining a quantized difference signal d'(t). The activity detector 24 uses both the step size Δ and the quantized difference signal d'(t) to determine whether the coded signal C(t) represents an active or an inactive source signal, and generates a reset signal R. The reset signal R is active when the source signal is determined to be inactive, and vice versa.

Specifically, the activity detector 24 activates the reset signal R when the step size Δ has its predetermined minimum value, provided the quantized difference signal d'(t) is within a predetermined vicinity of its minimum absolute value. The activity detector 24 tests the condition on d'(t) by comparing its absolute value |d'(t)| with a predetermined threshold exceeding the minimum possible positive quantized difference value d'(min).

The output register 26 stores the output signal y'(t) of the decoder, and receives the reset signal R. When the reset signal R is active, the output signal y'(t) stored in the output register 26 is reset to a fixed value such as zero.

The delay register 16 functions as a prediction circuit by delaying the output signal y'(t) stored in the output register 26 by one sample period to obtain a predicted value y'(t−1). The adder 14 adds the quantized difference value d'(t) to this predicted value y'(t−1) to obtain a decoded signal value that is stored in the output register 26 as the output signal y'(t) when the reset signal R is inactive.

Next, the noise-elimination operation of the third embodiment will be described.

The adaptive step-size controller 10 increases the step size Δ when the coded signal C(t) indicates relatively large difference values, and reduces the step size Δ when C(t) indicates relatively small difference values. When the source signal is inactive, the coded signal C(t) indicates only small values, and the adaptive step-size controller 10 reduces the step size Δ until a predetermined minimum step size is reached. The minimum step size is typically attained in a fraction of a second.

Under inactive source-signal conditions, when only granular noise is present, the absolute value of the quantized difference signal |d'(t)| remains at or near its minimum possible value. The threshold value used in the activity detector 24 leaves a certain margin above the minimum possible value, so that during inactive periods the absolute value |d'(t)| stays below the threshold.

Accordingly, when the source signal is inactive, once the step size Δ reaches its minimum value, the quantized difference d'(t) will be observed to remain in the necessary vicinity of its minimum absolute value, the activity detector 24 will activate the reset signal, and the output signal y'(t) will be held fixed. Thereafter, granular noise is completely eliminated for as long as the inactive condition persists.

When the source signal becomes active again, the quantized difference d'(t) moves outside the vicinity of its minimum absolute value and the reset signal R is cleared. The output signal y'(t) now takes on the value calculated by the adder 14, as in a conventional ADPCM decoder.

The third embodiment quickly and effectively eliminates granular noise during inactive periods, without loss of output signal resolution or high-frequency signal components during active periods.

The activity detector 24 can compare |d'(t)| with the predetermined threshold in any of several ways: for example, by comparing d'(t) with a pair of values, one positive and one negative; or by testing whether a certain number of most significant bits of d'(t) are all zero, or all one. Furthermore, since the step size Δ is required to be minimum, the condition on d'(t) can be tested by testing the coded signal C(t): for example, by testing whether certain bits of C(t) are all zero. The third embodiment can accordingly be varied by having the activity detector 24 receive C(t) instead of d'(t).

The activity detector 24 may also employ a more complex decision rule than the one described above. For example, the absolute value of the quantized difference signal |d'(t)| may be required to remain below the threshold for a predetermined number of most recent sample periods.

In another variation of the third embodiment, the delay register 16 receives the output of the adder 14 instead of the output of the output register 26.

In still another variation of the third embodiment, the delay register 16 and output register 26 are combined into a single register.

In a variation of any of the preceding embodiments, the coded signal is coded by adaptive delta modulation (ADM). ADM differs from ADPCM in that the coded signal C(t) is a one-bit signal, indicating only the sign of the quantized difference d'(t).

In another variation of any of the preceding embodiments, the coded signal is coded by APC (adaptive predictive coding). APC differs from ADPCM in that the predicted value is obtained from a plurality of preceding decoded signal values. The delay register 16 is replaced by a circuit that generates a linear combination of these preceding signal values.

The DAC 8 shown in the first and second embodiments is not an essential part of the invention, and may be omitted if digital output is required.

The invention may be practiced in hardware as illustrated in the drawings, or in software executed by a general-purpose computing device such as a microprocessor or digital signal processor.

The invention is not limited to the decoding of audio signals. The coded signal C(t) may be a predictively coded picture signal, for example.

Those skilled in the art will recognize that further variations are possible within the scope claimed below.

What is claimed is:

1. A predictive decoder decoding a predictively coded signal to obtain a decoded signal having a first number of bits per sample, comprising:
   a first register receiving the decoded signal and storing the first number of bits; and
   a second register coupled to the first register, receiving the first number of bits from the first register, storing a second number of bits, and providing the stored second number of bits as output signal data of the predictive decoder, the second number of bits being obtained by discarding a predetermined number of least significant bits from the first number of bits, the predetermined number of discarded bits being the number of least significant bits in which granular noise appears in the decoded signal.

2. The predictive decoder of claim 1, wherein the coded signal represents an audio signal, and the predetermined number of discarded bits is the number of least significant bits in which said granular noise appears in the decoded signal when the audio signal is silent.

3. The predictive decoder of claim 1, wherein the coded signal is coded by adaptive differential pulse-code modulation.

4. The predictive decoder of claim 1, wherein the coded signal is coded by adaptive predictive coding.

5. The predictive decoder of claim 1, wherein the coded signal is coded by adaptive delta modulation.

6. A method of removing granular noise from a predictively decoded signal, comprising the steps of:
   store the predictively decoded signal in a first register;
   discarding a predetermined number of least significant bits of the decoded signal to obtain an output signal, the predetermined number of discarded bits being the number of least significant bits in which granular noise appears in the predictively decoded signal; and
   storing the output signal in a second register.

7. The method of claim 6, wherein the predictively decoded signal represents an audio signal, and the predetermined number of discarded bits is the number of least significant bits in which said granular noise appears in the predictively decoded signal when the audio signal is silent.

8. The method of claim 6, further comprising the step of obtaining the predictively decoded signal by decoding a signal coded by adaptive differential pulse-code modulation.

9. The method of claim 6, further comprising the step of obtaining the predictively decoded signal by decoding a signal coded by adaptive predictive coding.

10. The method of claim 6, further comprising the step of obtaining the predictively decoded signal by decoding a signal coded by adaptive delta modulation.

11. A predictive decoder decoding a predictively coded signal to obtain a decoded signal, comprising:

a first register storing a current value of the decoded signal;

a second register storing an immediately preceding value of the decoded signal; and an arithmetic unit coupled to the first register and the second register, calculating a sum of the value stored in the first register and the value stored in the second register, providing a value equal to one-half the calculated sum as output signal data of the predictive decoder.

12. The predictive decoder of claim 11, wherein the coded signal is coded by adaptive differential pulse-code modulation.

13. The predictive decoder of claim 11, wherein the coded signal is coded by adaptive predictive coding.

14. The predictive decoder of claim 11, wherein the coded signal is coded by adaptive delta modulation.

15. A method of removing noise from a predictively decoded signal, comprising the steps of:

storing a current value of the predictively decoded signal;

storing an immediately preceding value of the predictively decoded signal;

calculating a sum of the current value and the immediately preceding value; and dividing the sum by two to obtain an output signal.

16. The method of claim 15, further comprising the step of obtaining the predictively decoded signal by decoding a signal coded by adaptive differential pulse-code modulation.

17. The method of claim 15, further comprising the step of obtaining the predictively decoded signal by decoding a signal coded by adaptive predictive coding.

18. The method of claim 15, further comprising the step of obtaining the predictively decoded signal by decoding a signal coded by adaptive delta modulation.

19. A predictive decoder receiving a predictively coded signal, having an adaptive step-size controller that adjusts step size according to the coded signal, a difference decoder that generates a quantized difference value from the coded signal and the adjusted step size, a prediction circuit that generates a predicted value, and an adder that adds the quantized difference value to the predicted value to obtain a decoded signal value, comprising:

an activity detector determining, from the adjusted step size and the quantized difference value, whether the coded signal represents an inactive source signal; and an output register coupled to the activity detector and the adder, storing a fixed reset value when the coded signal represents an inactive source signal, and storing the coded signal value when the coded signal does not represent an inactive source signal, the value stored in the output register being provided as an output signal of the predictive decoder, wherein the activity detector determines that the predictively coded signal represents an inactive source signal if the quantized difference value is within a predetermined vicinity of its minimum absolute value and the adjusted step size has a predetermined minimum value.

20. The predictive decoder of claim 19, wherein the coded signal is coded by adaptive differential pulse-code modulation.

21. The predictive decoder of claim 19, wherein the coded signal is coded by adaptive predictive coding.

22. The predictive decoder of claim 19, wherein the coded signal is coded by adaptive delta modulation.

23. A method of removing granular noise from a decoded signal obtained by receiving a coded signal, adjusting a step size according to the received coded signal, generating a quantized difference value from the coded signal and the adjusted step size, generating a predicted value, and adding the quantized difference value to the predicted value, comprising the steps of:

determining, from the adjusted step size and the quantized difference value, whether the coded signal represents an inactive source signal; and resetting the decoded signal to a fixed value when the coded signal represents an inactive source signal, wherein said step of determining further comprises the steps of:

comparing the adjusted step size with a predetermined minimum step size;

deciding whether the quantized difference value is within a predetermined vicinity of a predetermined minimum absolute value; and determining that the predictively coded signal represents an inactive source signal if the adjusted step size is the predetermined minimum step size and the quantized difference value is within the predetermined vicinity.

24. The method of claim 23, wherein the coded signal was coded by adaptive differential pulse-code modulation.

25. The method of claim 23, wherein the coded signal was coded by adaptive predictive coding.

26. The method of claim 23, wherein the coded signal was coded by adaptive delta modulation.

* * * * *